C. H. CLARE.
SECONDARY OR STORAGE BATTERY.
APPLICATION FILED MAY 4, 1908.

949,146.

Patented Feb. 15, 1910.

WITNESSES:
M. E. Flaherty
J. P. Phillips, Jr.

INVENTOR:
Charles H. Clare
by his attys
Clarke Raymond & Coale

UNITED STATES PATENT OFFICE.

CHARLES H. CLARE, OF STRATHAM, NEW HAMPSHIRE.

SECONDARY OR STORAGE BATTERY.

949,146.  Specification of Letters Patent.  Patented Feb. 15, 1910.

Application filed May 4, 1908. Serial No. 430,648.

*To all whom it may concern:*

Be it known that I, CHARLES H. CLARE, of Stratham, in the county of Rockingham and State of New Hampshire, a citizen of the United States, have invented a new and useful Improvement in Secondary or Storage Batteries, of which the following is a full, clear, and exact description, reference being had to the accompanying drawings, forming a part of this specification, in explaining its nature.

My invention relates to an improvement in secondary or storage batteries and pertains essentially to an improved form or type of frame or grid forming an electrode, which frame or grid bears or has in contact therewith an active material or material adapted to become active in the operation of the battery.

The object of my invention is to provide a frame or grid which shall have an increased surface presented or exposed to the active material; with which surface the active material will be kept in continual contact during the operation of the battery, and a frame or grid, also, in which the exposed surface and active material or point of activity between the same will be uniformly subjected throughout to the influence of the electrolyte or acid and to which the electrolyte or acid will be quickly and easily conducted so as to have as it were a direct access thereto.

My invention can best be seen and understood by reference to the drawings, in which—

Figures 1, 2:
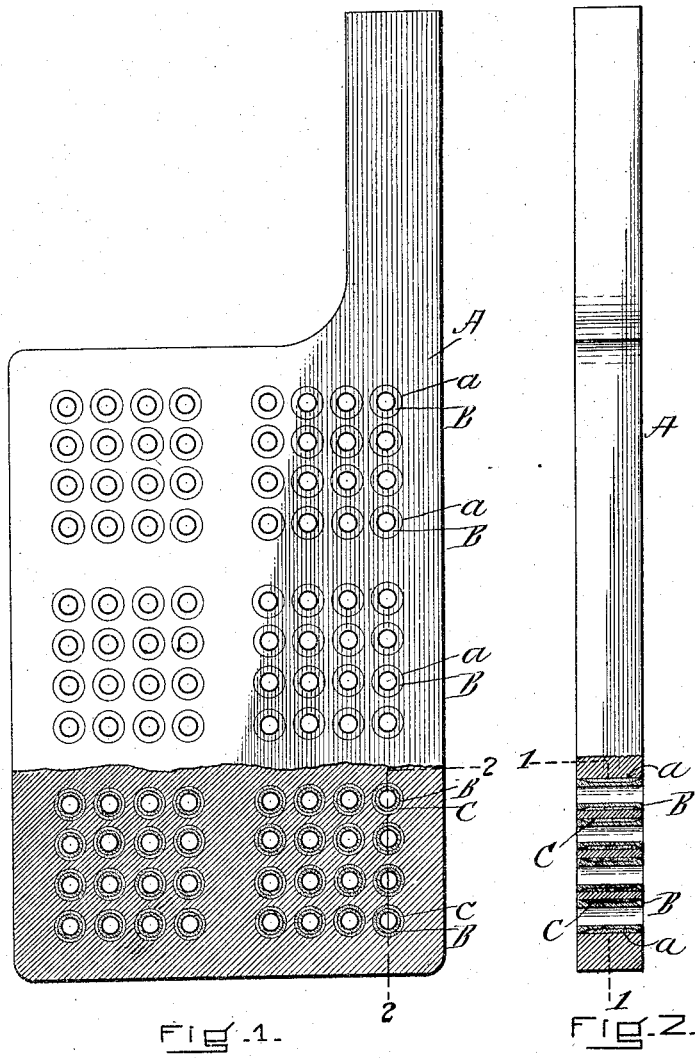
Figure 3:
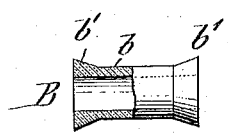
Figure 4:
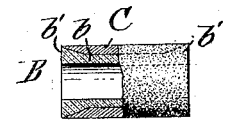

Figure 1 shows the frame partly in side elevation and partly in vertical section on the line 1—1 of Fig. 2. Fig. 2 shows the frame partly in end elevation and partly in cross section on the line 2—2 of Fig. 1. Figs. 3 and 4 show partly in side elevation and partly in cross vertical section the member or holder to which special reference will hereinafter be made, in Fig. 3 the member being shown uncoated and in Fig. 4 coated.

Referring to the drawings:—A is the frame or grid representing for purposes of illustration a battery plate or electrode and is preferably made of lead having a small percentage of antimony. Extending transversely through the frame are a series of openings or holes preferably cylindrical in form. In these openings formed in the frame are contained members, or what may be termed holders; B, inasmuch as they bear or carry active material C or material adapted to become active during the operation of the battery, and maintain or hold the same in contact with the interior exposed surfaces forming the respective openings in the frame or grid. The holders are adapted also to coöperate with the frame at the ends of the openings therein in such manner that the active material cannot escape from the ends of the openings, said members having also the further adaptation that an electrolyte or exciting fluid may have access through the same to the active material. In their preferable embodiment or construction the members or holders B all conform to the openings in the frame and are made in the form of a spool, the body portion $b$ of the holder being contained within the opening in the frame, being smaller than the opening so that the active material may be contained between such body and the adjacent surface of the frame forming the opening.

At the ends of the body portion of the holder there are provided flanges $b^1$ by which the holder may coöperate with the frame at the ends of the openings in it. The flanges of the holders are also preferably so arranged as to coöperate with the frame within the openings therein at the ends of the openings, the flanges having such degree of extension that the holder at either end will be of substantially the same width or diameter as the opening in the frame so as to fit snugly therein. Accordingly when the members are coated with active material the entire coated member or holder may be readily inserted within the hole or opening formed in the frame and the active material be maintained in proper coördination with the surface of the opening, the flanges on the holder at either end thereof acting to keep the active material from escaping from the ends of the opening during the operation of the battery, the body of the holder and said flanges forming, as it were, with the adjacent surface of the frame or grid a closed pocket in which the active material is contained.

In order that the electrolyte may have free and direct access and uniform application to the active material and all parts of the exposed surface forming the hole or opening in the frame or grid, the member or holder B is provided with a hole or opening therein into which the electrolyte may enter and which hole or opening preferably extends entirely through the member or holder so that the electrolyte or exciting fluid may enter and flow through the same. The member or holder is also preferably made of some porous material or ware so that as the exciting fluid or electrolyte enters into or flows through the member or holder it may pass through the wall of the member or holder and so have access to the active material and said exposed surface of the frame or grid.

In addition to the advantages above described in fulfilment of the object of my invention, it should be noted, also, that a further advantage of the construction resides in the fact that by using the porous members or holders with the active material on the outside thereof it will be a very difficult matter for the active material to crush these holders during the operation of the battery, whereas if the active material were on the inside of the holder the holder would be very easily broken by the expansion of the material.

Having thus fully described my invention, I claim and desire to secure by Letters Patent of the United States:—

1. A frame for a secondary or storage battery, said frame having therein a plurality of openings, active material or material adapted to become active during the operation of the battery applied to the surfaces of said openings, and means within said openings and coöperating with said frame at the ends of said openings for holding said material in place, which means also is adapted to the end that an exciting fluid may have access through the same to said material.

2. A frame for a secondary or storage battery having therein a plurality of openings, active material or material adapted to become active during the operation of the battery applied to the surfaces of said openings, and means capable of permitting the passage of an exciting fluid therethrough for holding said material in place against the surface of said openings, which means is adapted also to coöperate with said frame for preventing the escape of said material from the ends of said openings.

3. A frame for a secondary or storage battery having formed therein an opening, and means capable of permitting the passage of an exciting fluid therethrough for holding in place active material or material adapted to become active during the operation of the battery contained between said means and the surface forming said opening and which means is adapted also to coöperate with said frame at the end of said opening for preventing the escape of said material therefrom.

4. A frame forming an electrode for a storage battery, said frame having formed therein a plurality of openings, active material or material adapted to become active during the operation of the battery applied to the surfaces of said openings, and hollow porous members contained within said openings adapted to hold said active material and into the hollow of which members an exciting fluid may enter to have access to said active material.

5. A frame for a secondary or storage battery, said frame having formed therein a plurality of openings extending through said frame, active material or material adapted to become active during the operation of the battery in coördination with the surfaces of said openings, and porous members for maintaining said material in place, said members being open from end to end whereby an exciting fluid may enter and pass through the same and have access to said active material.

6. A hollow porous member having a body portion and flanges at either end thereof for use in an opening formed in a secondary or storage battery plate for holding in place active material or material adapted to become active during the operation of the battery applied to the surface of said opening.

7. A frame for a secondary or storage battery having formed therein an opening extending through the same, an active material or material adapted to become active during the operation of the battery in proper coördination with the exposed surface forming said opening, and a flanged member for maintaining said active material in place during the operation of the battery and adapted also to the end that an exciting fluid may enter and pass through the wall thereof to said active material or exposed surface forming the opening in said frame.

8. A frame for a secondary or storage battery having an opening formed therein, active material or material adapted to become active during the operation of the battery in proper coördination with the exposed surface forming said opening, and a flanged member for maintaining said material in place during the operation of the battery and adapted also to the end that an exciting fluid may enter and pass through the wall thereof to said material or exposed surface forming the opening in said frame.

9. A hollow porous member for use in an opening formed in a frame for a secondary or storage battery, said member having a body portion and flanges at either end thereof, and a coating of active material or material adapted to become active during the operation of the battery applied to the exterior of said body portion between said flanges.

10. A frame for a secondary or storage battery having an opening extending through the same, a hollow porous tubular member having a body portion and flanges at either end thereof, and an active material or material adapted to become active in the operation of the battery coating the body of said member between its flanges and which member is located within an opening in said frame whereby the active material will be applied to and maintained during the operation of the battery in proper coördination with the exposed surface forming the opening in said frame.

CHARLES H. CLARE.

In the presence of—
K. T. MULVEY,
J. P. CLARE.